(12) United States Patent
De Andreis et al.

(10) Patent No.: US 6,397,984 B1
(45) Date of Patent: Jun. 4, 2002

(54) AUTOMATIC CLEARANCE COMPENSATOR FOR A DRUM BRAKE FOR A MOTOR VEHICLE

(75) Inventors: Marco De Andreis, Torino; Luigi Cucinota, Milan, both of (IT)

(73) Assignees: Maff S.p.A., Bruzolo Di Susa; Automotive Products Italia (SV), Cairo Montenotte (IT)

( * ) Notice: Subject to any disclaimer, the term of this patent is extended or adjusted under 35 U.S.C. 154(b) by 0 days.

(21) Appl. No.: 09/763,677
(22) PCT Filed: Jun. 27, 2000
(86) PCT No.: PCT/EP00/05971
  § 371 (c)(1),
  (2), (4) Date: Feb. 26, 2001
(87) PCT Pub. No.: WO01/01008
  PCT Pub. Date: Jan. 4, 2001

(30) Foreign Application Priority Data

Jun. 29, 1999 (IT) .......................................... T099A0554

(51) Int. Cl.[7] .............................................. F16D 65/66
(52) U.S. Cl. .................................. 188/79.52; 188/79.53
(58) Field of Search .......................... 188/79.52, 79.53, 188/79.56, 196 BA

(56) References Cited

U.S. PATENT DOCUMENTS

| | | | | |
|---|---|---|---|---|
| 4,706,783 A | * | 11/1987 | Rath et al. | 188/196 BA |
| 4,706,784 A | * | 11/1987 | Shellhause | 188/196 BA |
| 4,729,457 A | * | 3/1988 | Cousin et al. | 188/196 BA |
| 5,246,090 A | * | 9/1993 | Quere et al. | 188/79.52 |

* cited by examiner

*Primary Examiner*—Christopher P. Schwartz
(74) *Attorney, Agent, or Firm*—Paul E. Milliken; Ray L. Weber

(57) ABSTRACT

In a clearance compensator, a rod (12) is fixed to one of the shoes of the brake and is slidable in an intermediate element (13) threadably engaged in another rod (11) secured to the other shoe. A heat-sensitive bi-metallic strip (18) projects from a leaf spring (14) operable to urge the rod (12) away from the intermediate element (13). The bi-metallic strip (18) is orientated substantially tangentially of a ratchet wheel (17) fixed to the intermediate element (13); at its free end, the bi-metallic strip (18) has a stop element (18a) for engaging the ratchet wheel (17). At temperatures above a predetermined value, the strip (18) assumes a heat-induced deflected condition in which the stop element (18a) is disengaged from the wheel (17).

9 Claims, 1 Drawing Sheet

AUTOMATIC CLEARANCE COMPENSATOR FOR A DRUM BRAKE FOR A MOTOR VEHICLE

FIELD OF THE INVENTION

This invention relates to an automatic compensator for the working clearance of the shoes of a drum brake for a motor vehicle.

BACKGROUND OF THE INVENTION

The European patent EP-B-O 538 909 describes an automatic compensator of the type defined in the preamble to Claim 1.

It is known that expansion of the brake drum can cause the mechanism to overcompensate when the brake is hot; if this is permitted to occur, all working clearance between the brake shoe liners and the drum could be lost, meaning that, when the brake cooled down, the liners would cause resistance, braking the wheels. Clearance must therefore be adjusted at relatively low temperatures and compensation must be prevented at high temperatures.

European patent EP-B-O 538 909 suggests providing the compensator with heat-sensitive means operable to prohibit compensation caused by thermal expansion. In the arrangement proposed in this patent, the heat-sensitive means include a bi-metal strip with one end fixed to a tubular insert slidable and rotatable on an intermediate sleeve member into which two rod elements to be connected to the brake shoes are inserted coaxially. The other end of the bi-metal strip has a precision-shaped head engageable in a locking seat formed in an insert securely fixed to one of the two rod elements when the temperature rises above a predetermined threshold. In these conditions, the compensator behaves like a rigid unit which is prevented from lengthening in order to stop a ratchet mechanism from shifting and adjusting the minimum resting length of the compensator.

This arrangement involves a drawback in that it requires the manufacture and fitting of small parts which must be of a very precise shape, and dimension in order to operate correctly at high temperatures. In particular, the head of the bi-metal strip and the seat thereof, formed in an insert fitted into one of the aforesaid rod elements, demand very high manufacturing and assembly tolerances, which can only be achieved in complex and costly operations.

The object of the present invention is to provide an improved automatic compensator while containing manufacturing costs.

This and other objects and advantages, which will be better understood later, are achieved, according to the present invention, by providing an automatic compensator having the characteristics claimed in the characterising portion of Claim 1.

Other important characteristics are described in the dependent Claims.

SUMMARY OF THE INVENTION

A clearance compensator for the shoes of a drum brake for motor vehicle, of a type including: three coaxial elements, comprising a first rod element with a head portion for fixing against rotation to a first brake show and a threaded stem portion, an intermediate element threadably engaged to the said first rod element, a second rod element with a head portion for fixing non-rotatably to a second brake show and a stem portion slidably connected to the intermediate portion so as to be freely rotatable with respect thereto; a tubular insert rotatably mounted to the intermediate element for sliding axially thereon and capable of reaching an axial stop position on said intermediate element; a ratchet wheel secured for rotation with the intermediate element between the second rod element and the tubular insert; a leaf spring acting between the second rod element and the tubular insert so as to urge the second rod element away from the intermediate element, the said leaf spring carrying a stop element for engaging the ratchet wheel; heat-sensitive be-metal strip means for preventing the ratchet wheel from rotating when the temperature of the brake exceeds a predetermined value; characterized in that the said bi-metal strip means include a bi-metal strip fixed so as to project from the leaf spring, orientated so as to be substantially tangential to the ratchet wheel and having the said stop element at the free end thereof; the said strip having a normal operating position in which the stop element engages the ratchet wheel and a heat-inflected position in which the stop element is disengaged from the said ratchet wheel at temperatures exceeding a predetermined value.

BRIEF DESCRIPTION OF THE DRAWINGS

The characteristics and advantages of the invention will become more apparent from the following detailed description of several embodiments thereof with reference to the appended drawings, provided purely by way of non-limitative example, in which.

DETAILED DESCRIPTION OF THE DRAWINGS

Figure 1:
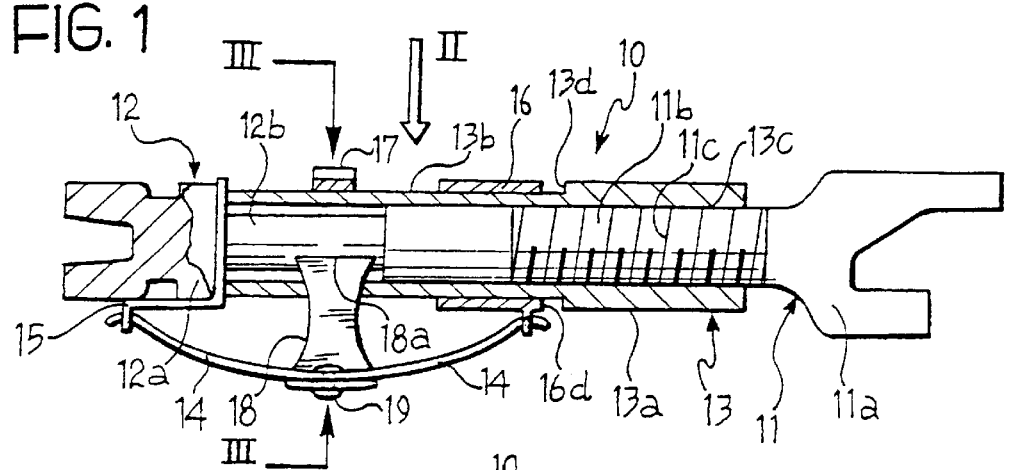
FIG. 1 is a partially sectioned longitudinal view of a clearance compensator according to the present invention.

With reference to FIG. 1, a clearance compensator according to the invention is generally indicated 10.

The clearance compensator 10 includes a pair of rod-like elements 11, 12, each of which has a respective forked head 11a, 12a for fixing against rotation to one of the two shoes (not shown for the sake of simplicity) of a drum brake for motor vehicles. The rod-like elements 11, 12 form respective stem portions 11b, 12b inserted into, and axially aligned with, the opposite ends of an intermediate element 13 in the form of a straight tubular sleeve, which is formed to advantage in one piece.

The stem portion 11b (on the right in FIG. 1) has a helical thread 11c for engagement in a corresponding thread 13c formed in the right hand portion of the internal cylindrical surface of the intermediate sleeve 13; the stem portion 12b is smooth to enable it freely to rotate or to reciprocate inside the sleeve 13 during braking cycles.

A spring steel leaf spring 14 is interposed, under compression between the head portions 12a of the rod element 12 and the sleeve 13, with a first end fixed to a support insert 15 secured to the head portion 12a and a second end secured to a tubular insert 16, rotatable and axially slidable on the intermediate sleeve 13.

The outer surface of the sleeve 13 has a larger-diameter portion 13a on the end of the threaded rod 11 and a smaller-diameter portion 13b on the end of the rod element 12; the two portions 13a, 13b define a step 13d between them which forms an abutment surface for the right hand edge 16d of the tubular insert 16.

The clearance compensator includes a ratchet mechanism operable to move the two rod elements 11, 12 gradually away from each other, so as to lengthen the rest position of the compensator, should the two elements move axially by more than a predetermined threshold while moving apart in following the movement of the shoes during a braking cycle as a result of the brake linings being worn.

The ratchet mechanism includes a ratchet wheel 17 force fitted on the portion 13b of the outer surface of the sleeve 13, and a stop element or tooth 18a carried by the leaf spring 14 and operable to engage the ratchet wheel 17. In this per se known arrangement, one click of the stop element 18a on the ratchet wheel 17 causes the sleeve 13 to become partially unscrewed from the rod element 11. This unscrewing causes the rest configuration of the compensator to be lengthened, thus restoring the ideal rest spacing between the shoes and the drum.

Figure 3:
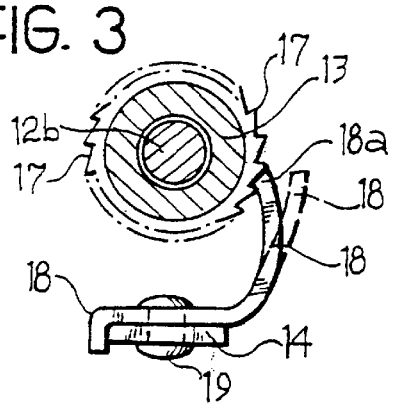
FIG. 3 shows a cross section taken on the line III—III of FIG. 1.

According to the present invention, the stop element 18a is formed by the free end of a heat sensitive bi-metal strip 18, welded or preferably fixed by a rivet 19 so as to protrude from the spring 14. As shown in FIG. 3, the bi-metal strip 18 is orientated substantial tangential to the ratchet wheel 17, in such a way that when the temperature of the brake rises above a predetermined threshold, the strip 18 is deflected, moving away from the ratchet wheel 17 and disengaging the stop element 18a therefrom.

In this disengaged condition, the ratchet mechanism does not act to increase the length of the compensator and thus adjust the clearance between the shoes and the brake drum.

The clearance compensator operates as follows.

When the vehicle brakes are released, the clearance compensator is in a withdrawn condition in which the head portion 12a bears against the intermediate sleeve 13, the edge 16d of the tubular insert 16 bears against the step 13d and the leaf spring 14 is resiliently loaded in an arched condition in which it keeps the stop element 18a engaged against a tooth of the ratchet wheel 17.

When the brakes are operated, the shoes (not shown) move apart and the slidable rod element 12 moves to the left relative to the assembly of the sleeve 13 and the threaded rod 11. This separating movement of the inserts 15 and 16 from one another enables the spring 14 to extend, with its median portion moving nearer to the intermediate sleeve 13 in proportion to the extent of this shifting.

During small shifting of the compensator, the stop element 18a remains engaged on a tooth of the ratchet wheel 17, without moving beyond this tooth when the brake is released and the spring once more forms an arc.

If, however, the fact that the brake shoe linings are worn causes the compensator to move axially past an established threshold, at the moment when the brake is released, the spring 14 arches and causes the stop element 18a to move past one or more teeth around the wheel 17 in the only direction permitted; as a result, during the extension phase when the brakes are next applied, the spring 14 slightly rotates the sleeve 13 by means of the stop element 18a engaged on the ratchet wheel 17. This causes the threaded rod element 11 to become partially unscrewed from the intermediate sleeve 13, thereby lengthening the rest position of the compensator, as stated earlier.

On the other hand, the above discussed automatic adjustment does not occur when the bi-metal strip 18 is deflected by the heat and disengaged from the ratchet wheel. In such conditions, the relative sliding of the rod elements 11 and 12 during a braking cycle does not cause the sleeve 13 to rotate and does not therefore adjust the length of the compensator, regardless of the distance that this travels. When the bi-metal strip is disengaged from the ratchet wheel, the rod element 12 on the one side, and the intermediate sleeve 13 and the rod element 11 on the other side slide freely, accompanying the opening and closing movements of the respective shoes to which they are connected.

It will be appreciated that the present invention enables the number of components of the compensator to be reduced, since the stop element of the ratchet mechanism now incorporates the function of the heat sensitive element. One element, that is the bi-metal strip as a separate entity to the stop element, has thus been eliminated compared to the arrangement described, for example, in the European patent EP-B-0 538 909. It will also be appreciated that the present invention does not require the high-precision work needed to form the locking means on the head of the conventional bi-metal strip and the engagement seats in an insert fixed to one of the rod elements; assembly times are thus also reduced.

In addition, the leaf spring 14 could also be manufactured as a strip of more simple shape, as it would no longer be required to form an integral projecting portion constituting the stop element of the ratchet mechanism, thus saving on the material used to manufacture the spring.

Figure 2:
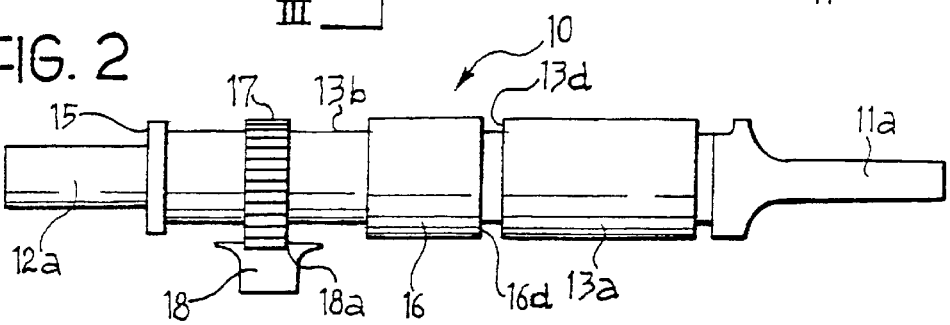
FIG. 2 is a view from above of the compensator of FIG. 1 in the direction of the arrow II.
Figure 4A:
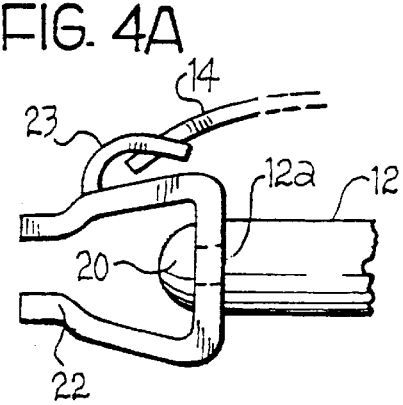
FIGS. 4A and 4B are schematic views illustrating certain details of an alternative embodiment of the compensator of the invention.
Figure 4B:
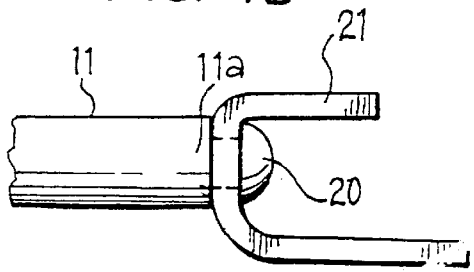

With reference to FIGS. 4A and 4B, in a possible variant of the invention it is possible to improve the attachment of the rod elements 11 and 12 to the respective shoes. Instead of forming forked heads in one piece with the head portions of the rod elements 11, 12, as shown in FIGS. 1 and 2, sheet metal forks 21 and 22, constituting means for fixing to the shoes (not illustrated), are fixed on by means of rivets 20 or by welding. The same fork 22 fixed to the sliding rod element 12 forms to advantage a seat or locking means 23 for the left end of the leaf spring 14.

In this variant, the shape of the rod elements 11 and 12 is simpler, making them more economical to manufacture as well as lighter, since the conventional head portion, provided to ensure that the shoes could move relative to the compensator when this was blocked, is eliminated. The heads 11a and 12a could now be permanently hooked to the shoes so as always to follow their movement, independently of the operating condition of the compensator.

What is claimed is:

1. A clearance compensator for the shoes of a drum brake for motor vehicles, of a type including:

three coaxial elements, comprising a first rod element with a head portion for fixing against rotation to a first brake shoe and a threaded stem portion (11c), an intermediate element (13) threadedly engaged to the said first rod element, a second rod element (12) with a head portion for fixing non-rotatably to a second brake shoe and a stem portion slidably connected to the intermediate portion (13) so as to be freely rotatable with respect thereto;

a tubular insert (16) rotatably mounted to the intermediate element (13) for sliding axially thereon and capable of reaching an axial stop position (13d) on said intermediate element;

a ratchet wheel (17) secured for rotation with the intermediate element (13) between the second rod element (12) and the tubular insert (16);

a leaf spring (14) acting between the second rod element (12) and the tubular insert (16) so as to urge the second rod element (12) away from the intermediate element (13), the said leaf spring carrying a stop element (18a) for engaging the ratchet wheel (17);

heat-sensitive bi-metal strip means for preventing the ratchet wheel (17) from rotating when the temperature of the brake exceeds a predetermined value; characterised in that the said bi-metal strip means include a bi-metal strip (18) fixed so as to project from the leaf spring (14), orientated so as to be substantially tangential to the ratchet wheel (17) and having the said stop element (18a) at the free end thereof; the said strip having a normal operating position in which the stop element (18a) engages the ratchet wheel (17) and a heat-inflected position in which the stop element (18a) is disengaged from the said ratchet wheel (17) at temperatures exceeding a predetermined value.

2. A compensator according to claim 1, characterised in that the head portions (11a, 12a) of the rod elements (11, 12) have means (21, 22) for fixing them to the brake shoes.

3. A compensator according to claim 2, characterised in that the said fixing means include sheet metal elements (21, 22) fixed to the head portions (11a, 12a).

4. A compensator according to claim 3, characterised in that the sheet metal element (22) fixed to the second rod element (12) has a seat or means (23) for retaining one end of the leaf spring (14).

5. A compensator according to claim 3, characterised in that the said sheet metal elements (21, 22) are formed from pressed sheet metal strips.

6. A compensator according to claim 1, characterised in that the said intermediate element (13) is a straight tubular sleeve formed in one piece with the outer surface thereof forming a cylindrical portion (13a) of larger diameter at the end of the first rod element (11) and a cylindrical portion (13b) of smaller diameter at the end of the second rod element (12), the said portions (13a, 13b) forming a step (13d) between them providing a stop for an edge (16d) of the tubular insert (16).

7. A compensator according to claim 6, characterised in that the said ratchet wheel (17) is force fitted onto the smaller diameter cylindrical portion (13b) of the outer surface of the intermediate element (13).

8. A compensator according to claim 1, characterised in that the said bi-metal strip (18) is fixed to the leaf spring (14) by a rivet (19).

9. A compensator according to claim 1, characterised in that the said bi-metal strip (18) is fixed to the leaf spring (14) by welding.

* * * * *